UNITED STATES PATENT OFFICE.

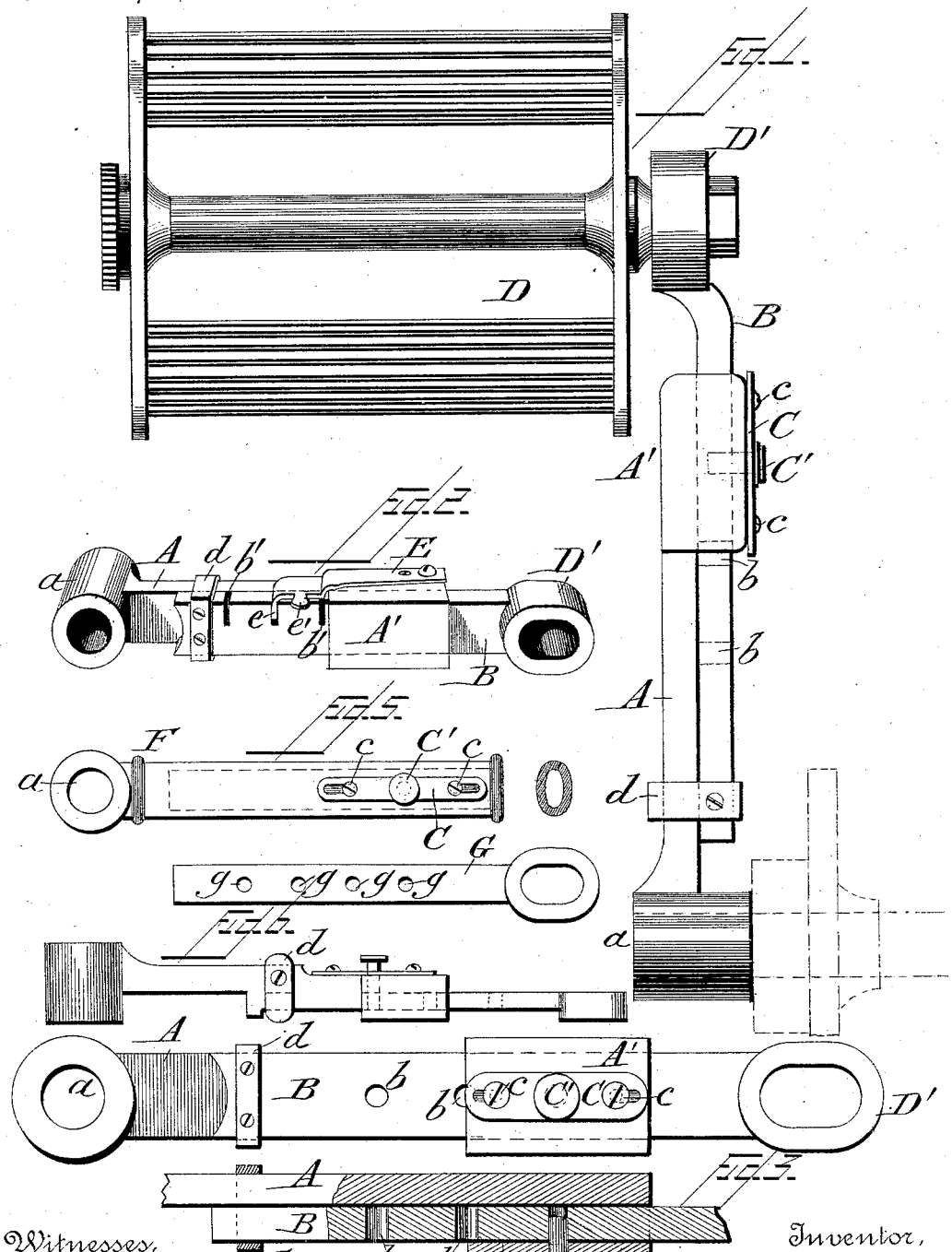

GEORGE KIBBE, OF AMSTERDAM, NEW YORK.

EXTENSIBLE CRANK-ARM.

SPECIFICATION forming part of Letters Patent No. 385,717, dated July 10, 1888.

Application filed February 11, 1888. Serial No. 263,685. (No model.)

*To all whom it may concern:*

Be it known that I, GEORGE KIBBE, a citizen of the United States, residing at Amsterdam, in the county of Montgomery and State of New York, have invented certain new and useful Improvements in Extensible Crank-Arms; and I do hereby declare the following to be a full, clear, and exact description of the invention, such as will enable others skilled in the art to which it appertains to make and use the same.

My invention has reference to an extensible crank-arm, more particularly those crank-arms used in connection with pedals of bicycles and tricycles and similar vehicles, but adapted equally well to be applied to and used with all kinds of machinery, the object of the invention being to enable the web or arm of a crank to be lengthened or shortened for the purpose of adjusting and determining the extent of its throw; and the invention consists, essentially, in the construction, arrangement, and combination of parts whereby the crank-arm is extended or shortened, substantially as will be hereinafter described and then claimed.

In the annexed drawings, Figure 1 is an edge plan view of my improved extensible crank-arm shown in connection with the pedal of a bicycle or other vehicle. Fig. 2 is a perspective view of a modified form of my improved device. Fig. 3 is a side elevation of the crank-arms shown in Fig. 1. Fig. 4 is a longitudinal sectional detail of the same, showing particularly the mode of operation of the spring dog or catch. Fig. 5 exhibits details of a still further modified form of the construction of the invention. Fig. 6 is a view showing other modifications in detail.

Like letters of reference indicate corresponding parts throughout all the different figures.

I have represented my invention as applied to a bicycle or tricycle pedal for the purpose of regulating and adjusting the extent of its throw; but I do not wish to confine myself to any specific use or any individual application of the invention, as it may be adapted for use with very many different kinds of machinery. The present illustration and description therefore is to indicate one way of practically applying the invention, and is for an example only.

A denotes a rod or bar constituting a portion of the crank-arm, and provided on one end with a bearing, *a*, which connects with the shaft which the crank is used to rotate. The other end of the rod or bar A is formed with a box or hollow enlargement, A′, which receives and permits to slide within it another rod or bar, B, likewise constituting a portion of the web or crank-arm, and provided on one end with a bearing, D′, whereby a pedal, as D, is securely affixed to said rod B. The other end of the rod B carries a loop, *d*, which surrounds the rod A. The hollow box A′ and loop *d* serve to keep the rods A and B in close contact and permit the latter to have an easy and accurate movement over the face of the former, or vice versa.

It will be evident from what has just been said that the two parts A and B together constitute the crank-arm, and that they by proper manipulation may be so adjusted as to furnish a crank-arm having a length substantially equal to one or either of them, or may be adjusted so as to permit the crank-arm to have a length substantially equivalent to both of them. It is immaterial whether the loop *d* be affixed to the rod B or the rod A. In Fig. 1 it is affixed to the rod B. In Fig. 6 it is secured to the part A. Furthermore, it is immaterial whether the rod B slides on one side of the rod A or upon the other. Having shown that these two rods A and B may be relatively moved and adjusted, it is necessary to describe means for holding them in any position to which they may be adjusted. In Fig. 1 I have shown one form of a spring dog or catch to use for this purpose. It consists of a pin, C′, secured to a spring-plate, C, which is affixed by means of screws *c c* to the hollow box A′ in a line parallel to the direction of the rods A and B. The spring-plate C is furnished with slots, which receive the screws *c c*. Furthermore, the rod B is provided with a series of holes or apertures, *b*, adapted to receive the pin C′. The mode of operation of the spring-catch will be evident from inspection of Fig. 4. When it is desired to relatively adjust the bars A and B, the operator can lay hold of the head of the pin C′, drawing it out of the hole in which it may be situated, and in so drawing out the pin he will bend the spring-plate C into the position shown in dotted lines in Fig. 4, the slots in said plate C permitting the bending thereof, while the screws c c prevent the plate from being displaced from its proper position while being bent. It is evident, now, that if the two rods A and B be moved upon each other the pin C′ will automatically drop into the next hole b under the action of the spring-plate C, and this spring-plate will serve to keep the pin in position within any one of the holes in which it may have dropped until it is again withdrawn for the purpose of enabling the rods to be further adjusted.

In Fig. 2 I have shown a modification in construction of the spring-clamp. Instead of providing the rod or bar B with holes b, I provide it with notches b′ on the edge of said bar. Instead, moreover, of having the spring-plate C and the pin C′, I provide a spring-catch, E, consisting of a plate secured at one end to the hollow box A′ and having a foot, e, which is calculated to enter the notches b′. The spring-catch is then lifted out of engagement with the notches by means of the projection or handle e′. The operation to be pursued for relatively adjusting the parts A and B will be evident from the foregoing description of their construction and arrangement without need of further details. A thumb-screw may be used in place of the clamp.

A still further modification in the construction of the device is shown in Fig. 5. There the part which corresponds with the rod or bar A is formed of a tube, being preferably elliptical in cross-section. Said tube is lettered F. This tube carries the ordinary bearings, a, with which the rod A is provided, as we have seen in Fig. 1. In this modified form, instead of the rod B, I employ a rod, G, adapted to fit and slide within the tube F, said rod G being furnished with a series of holes or apertures, g g. Upon the tube F is mounted a spring catch or dog, substantially of the form shown in Fig. 1, and having the same pin C′, which, passing through the wall of the tube, is adapted to enter the holes g g in the rod G. Thus it will be seen that the rod G may be adjusted relatively to the tube F, so as to make a longer or a shorter crank-arm, and that the rod G may be held in any position to which it may have been adjusted by means of the spring-catch.

In Fig. 6 I have illustrated certain modifications. Instead of having the spring-dog on the side of the part A′ where it is shown in Fig. 1, I place it upon the opposite side, permitting it to enter the holes in the rod B from the side opposite to that which it is caused to enter in Fig. 1. This, however, is an immaterial change, and merely shows that I do not confine myself to the exact construction, arrangement, and location of the parts as represented in the drawings, but reserve the liberty of varying the location, in changing the parts to better suit the purposes of their construction and arrangement, and, in fact, in modifying the details of my invention within wide limits without departing from the broad principles of the same.

Having thus described my invention, what I claim as new, and desire to secure by Letters Patent, is—

1. In an extensible crank-arm, the combination, with a rod having a hollow guide-box, of another rod moving within said guide-box and adjustable with relation to the first bar, and a spring-dog arranged upon said guide-box and having a part that enters notches or apertures in the second bar, substantially as described.

2. In an extensible crank-arm, the combination, with a tubular portion, of an apertured part adapted to enter said portion and be adjustable therein, and a spring clamping-dog arranged to enter the apertures in the rod, and thus hold the rod and tubular portion securely in any desired relative position, substantially as described.

3. The combination, with the rod A, having the hollow enlargement A′, of the rod B, having the loop d, surrounding rod A, and provided with holes b b, and a spring clamping device consisting of the slotted plate C and the pin C′, all arranged to operate substantially as described.

4. The combination of the rod A, having hollow enlargement A′, the rod B, having apertures b b, the loop d, and the clamping device consisting of the pin C′, the slotted plate C, and the screws c c, all arranged substantially as described.

In testimony whereof I affix my signature in presence of two witnesses.

GEORGE KIEBE.

Witnesses:
CHARLES S. NISBET,
MARTIN S. STOVER.